US007822105B2

(12) United States Patent
Underbrink et al.

(10) Patent No.: US 7,822,105 B2
(45) Date of Patent: Oct. 26, 2010

(54) CROSS-CORRELATION REMOVAL OF CARRIER WAVE JAMMING SIGNALS

(75) Inventors: Paul Underbrink, Lake Forest, CA (US); Henry Falk, Long Beach, CA (US); Charles Norman, Huntington Beach, CA (US)

(73) Assignee: Sirf Technology, Inc., San Jose, CA (US)

( * ) Notice: Subject to any disclaimer, the term of this patent is extended or adjusted under 35 U.S.C. 154(b) by 1231 days.

(21) Appl. No.: 10/689,565

(22) Filed: Oct. 20, 2003

(65) Prior Publication Data

US 2005/0047493 A1  Mar. 3, 2005

Related U.S. Application Data

(60) Provisional application No. 60/499,961, filed on Sep. 2, 2003.

(51) Int. Cl.
*H04B 1/707* (2006.01)
(52) U.S. Cl. .................... 375/148; 375/150; 342/357.15
(58) Field of Classification Search ................. 375/148, 375/285, 349, 150, 149, 144; 342/357.2, 342/357.15, 357.12, 357.06; 370/342; 701/213
See application file for complete search history.

(56) References Cited

U.S. PATENT DOCUMENTS

| | | | | |
|---|---|---|---|---|
| 5,650,785 A * | 7/1997 | Rodal | ..................... | 342/357.12 |
| 5,955,987 A * | 9/1999 | Murphy et al. | ......... | 342/357.06 |
| 6,044,074 A * | 3/2000 | Zehavi et al. | ................ | 370/350 |
| 6,184,822 B1 * | 2/2001 | Fenton et al. | .......... | 342/357.12 |
| 6,236,354 B1 * | 5/2001 | Krasner | .................. | 342/357.06 |
| 6,282,231 B1 | 8/2001 | Norman et al. | ............. | 375/144 |
| 6,448,925 B1 | 9/2002 | Shridhara | | |
| 6,516,021 B1 * | 2/2003 | Abbott et al. | ................ | 375/150 |
| 6,577,271 B1 | 6/2003 | Gronemeyer | | |
| 6,606,349 B1 | 8/2003 | Kudhrethaya et al. | | |
| 6,621,855 B1 * | 9/2003 | Van Stralen et al. | ......... | 375/142 |
| 6,710,739 B1 * | 3/2004 | Loegering | .............. | 342/357.12 |
| 7,116,704 B2 * | 10/2006 | Norman et al. | ............. | 375/148 |
| 2002/0012411 A1 * | 1/2002 | Heinzl et al. | ................ | 375/350 |
| 2002/0025828 A1 * | 2/2002 | Turetzky et al. | ............. | 455/550 |
| 2003/0108085 A1 * | 6/2003 | Keller et al. | ................ | 375/145 |
| 2005/0037724 A1 | 2/2005 | Walley et al. | | |

FOREIGN PATENT DOCUMENTS

EP  0 884 885 A1  12/1998
WO  WO 00/55992 A1  9/2000

OTHER PUBLICATIONS

New Fast GPS Code-Acquisition Using FFT, Electronic Letters, vol. 27, No. 2, pp. 159-160 (1991).
Novel Fast GPS/GLONASS Code Acquisition Technique Using Low Update Rate FFT, Electronic Letters, vol. 28, No. 9, pp. 863-865 (1992).

* cited by examiner

*Primary Examiner*—Chiem M Fan
*Assistant Examiner*—Aristocratis Fotakis
(74) *Attorney, Agent, or Firm*—K&L Gates LLP (57) ABSTRACT

A receiver capable of receiving a spread spectrum signal and having a crosscorrelator that enables a carrier wave (CW) jamming to be identified, tracked, replicated and removed from the received spread spectrum signal after demodulation of a weak signal has occurred.

21 Claims, 4 Drawing Sheets

FIG. 1

Prior Art

CROSS-CORRELATION REMOVAL OF CARRIER WAVE JAMMING SIGNALS

RELATED APPLICATIONS

This application claims the benefit of U.S. Provisional Application Ser. No. 60/499,961, filed Sep. 2, 2003, titled "A GPS SYSTEM."

This application also is related to:

U.S. patent application Ser. No. 10/712,789, filed on Nov. 12, 2003, now issued as U.S. Pat. No. 7,183,972, titled "COMMUNICATION SYSTEM THAT REDUCES AUTO-CORRELATION or CROSS-CORRELATION IN WEAK SIGNALS," by Gregory B. Turetzky, Charles Norman and Henry Falk, which claims priority to U.S. Pat. No. 6,680,695, filed on Jul. 20, 2001, and issued on Jan. 20, 2004, by Gregory B. Turetzky, Charles Norman and Henry Falk, which claimed priority to United States Provisional Patent Application Ser. No. 60/227,674, filed on Aug. 24, 2000, titled "METHOD AND APPARATUS FOR ELIMINATING AUTO-CORRELATIONS OR CROSS-CORRELATIONS IN WEAK CDMA SIGNALS" by Gregory B. Turetzky, Charles Norman and Henry Falk.

U.S. patent application Ser. No. 10/775,870, filed on Feb. 10, 2004, now issued as U.S. Pat. No. 7,026,986, titled "LOCATION SERVICES SYSTEM THAT REDUCES AUTO-CORRELATION OR CROSS-CORRELATION IN WEAK SIGNALS," by Gregory B. Turetzky, Charles Norman and Henry Falk, which claims priority to U.S. patent application Ser. No. 10/244,293, filed on Sept. 16, 2002, now issued as U.S. Pat. No. 6,707,423, titled "LOCATION SERVICES SYSTEM THAT REDUCES AUTO-CORRELATION OR CROSS-CORRELATION IN WEAK SIGNALS," by Gregory B. Turetzky, Charles Norman and Henry Falk, which claims priority to U.S. Pat. No. 6,466,161, filed on Jul. 20, 2001, titled "LOCATION SERVICES SYSTEM THAT REDUCES AUTO-CORRELATION OR CROSS-CORRELATION IN WEAK SIGNALS," by Gregory B. Turetzky, Charles Norman and Henry Falk, which claimed priority to United States Provisional Patent Application Ser. No. 60/227,674, filed on Aug. 24, 2000, titled "METHOD AND APPARATUS FOR ELIMINATING AUTO-CORRELATIONS OR CROSS-CORRELATIONS IN WEAK CDMA SIGNALS" by Gregory B. Turetzky, Charles Norman and Henry Falk.

BACKGROUND OF THE INVENTION

1. Field of the Invention

This invention relates generally to signal processing in a radio receiver and more particularly to removal of undesired signals received at the radio receiver.

2. Related Art

Numerous communication systems rely on receiving one or more radio frequency (RF) signals. As the available frequency bands become more congested, the numerous radio frequencies used by the different communication systems start to interfere with each other. One type of interference encountered in the different communication systems is carrier wave interference or more commonly called carrier wave (CW) jamming.

CW jamming is a source of interference in spread spectrum systems, such as CDMA cellular telephone systems and satellite positioning systems. Spread spectrum communication systems use lower power signals spread across the frequency spectrum and are subject to interference from carrier waves used in other communication systems. The problem of CW jamming is further complicated because of the geographical area covered by spread spectrum system may include the whole Earth, for example the United States' Global Position System (GPS).

Attempts to eliminate CW jamming signals have occurred by regulating frequency use and by adding dedicated circuitry to radio receivers. The added circuitry being included in radio receivers often result in additional power consumption and expense. Some examples of jamming signal detection approaches and signal performance improvement approaches may be found in U.S. Pat. Nos. 6,448,925, 6,577,271, 6,606, 349, and patent application Ser. No. 09/562,749.

Therefore, there is a need for methods and systems for identifying and removing CW jamming signals that overcomes the disadvantages set forth above, and others previously experienced.

SUMMARY

Systems consistent with the present invention provide a receiver that is capable of receiving a spread spectrum signal that contains a CW jamming signal along with a weak signal. The signal is processed with a crosscorrelator that enables the CW jamming signal to be identified, tracked, and reproduced. The replicated CW jamming signal is subtracted from the received signal after demodulation, thus enabling the weak signal to be processed.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The components in the figures are not necessarily to scale, emphasis instead being placed upon illustrating the principles of the invention. In the figures, like reference numerals designate corresponding parts throughout the different views.

DETAILED DESCRIPTION

Figure 1:
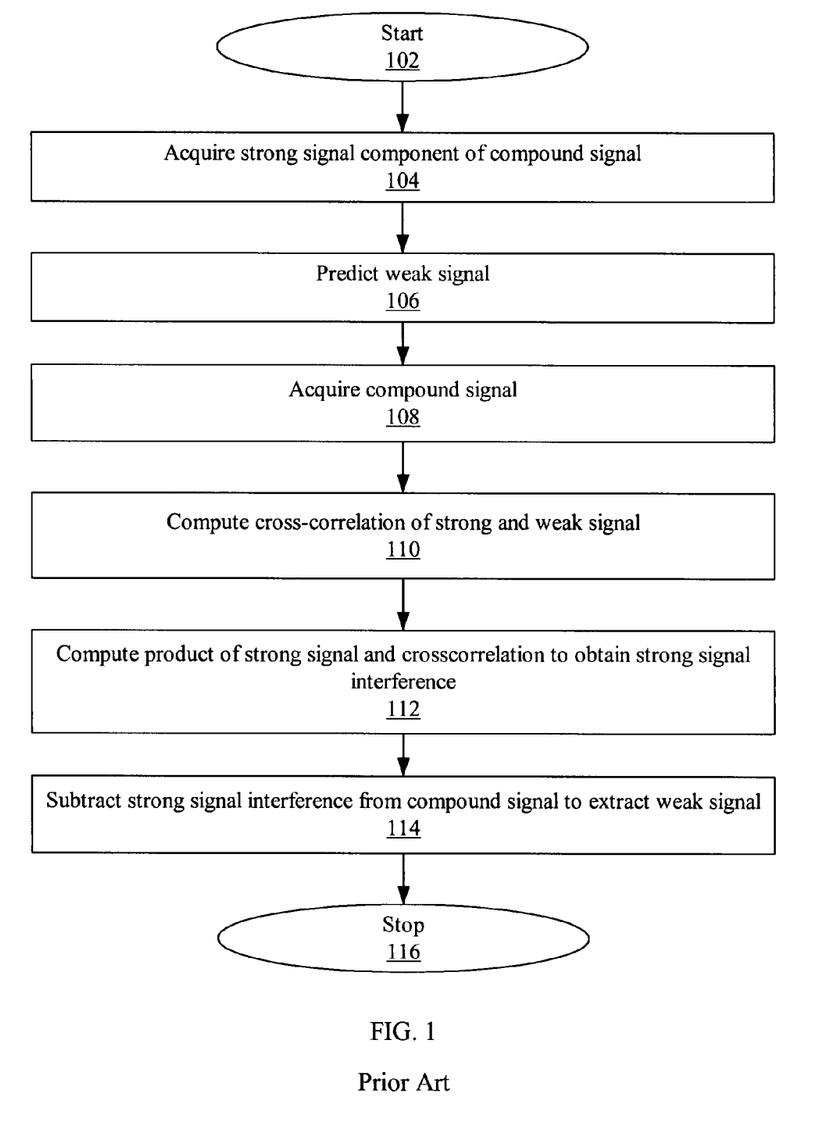
FIG. 1 is a flow diagram depicting strong signal cancellation in a weak spread spectrum signal using crosscorrelation.

Turning first to FIG. 1, a flow diagram 100 depicting strong signal cancellation in a weak spread spectrum signal using crosscorrelation is shown. A strong/weak or near/far signal isolation provided by a spread spectrum, pseudo random number (PRN) code family such as used in CDMA spread spectrum systems is dependent upon the crosscorrelation between the various code members of the family. In the case of a satellite positioning system, such as GPS, the isolation of two signals at the same frequency (or multiples of the code repetition rate, in this case 1 KHz) is about 21 to 23 dB. If the relative strengths of two signals differ by more than this limit, the weaker signal cannot be discriminated using only the spreading code. A method of removing the effects of the stronger signal may be applied if the weaker signal is to be tracked.

The crosscorrelation effect is at its maximum when the relative Doppler frequency offset between the relatively strong and weak signals is an integer multiple of 1 KHz in the case of coarse acquisition code (C/A) in the GPS signals. A general solution to the problem of tracking a weak signal spread spectrum signal in the presence of a stronger spread spectrum signal is based on the premise that all aspects of the strong signal's interference can either be measured or calculated in order to remove it from the weaker signal. The solution can be implemented in any multi-channel receiver having the ability to control a channel's frequency and phase as well as selecting the desired spreading code and setting that code's phase position. The receiver typically employs two channels, one to track the weak signal and one to track the interfering strong signal. However, the channel that is used to track the strong signal is not required if the characteristics such as power, code phase and frequency of the strong signal can be obtained or accurately estimated by alternate means.

As shown generally in FIG. 1, the procedure starts 102 with the strong signal being acquired 104, such as by tracking the strong signal in a first channel of the receiver. The channel provides a measurement of the signal strength of the strong signal along with the phase of the carrier signal and the spreading code. Additional channels may be used to track additional strong signals (not shown in FIG. 1).

The code phase of the spreading code of the weaker signal, along with its received frequency and signal phase, are predicted 106 based on the 50 Hz navigation data code data (D) by methods known in the art. A second channel in the receiver is dedicated to receiving the compound carrier signal and tracking 108 the predicted weak signal component.

The second receiver channel correlates the incoming signal with the second code at the predicted frequency and signal phase. The resulting in-phase and quadrature (I,Q) measurements contain both the weak signal and the strong signal, each spread by their unique code. Correlation by multiplication of the replica code for the second signal, Code2R, with the incoming signal yields the product Code2R*(weak2*Code2+StrongX*CodeX+ . . . ) where weak2 is the power of weak signal 2, Code2 is the actual code for satellite 2 broadcasting the weak signal 2, StrongX (X=1, 3, 4, . . . ) is the power of strong signal X, and CodeX is the actual code for satellite X contained in the signal. The product Code2R*Code2 is the autocorrelation of the received code 2 and the replica code 2. The autocorrelation function has a value of 1 if the replica code is aligned with the received code. This crosscorrelation of replica code 2 with Strong X (Code2R*CodeX) is next computed 110 to be removed from the compound signal.

Code1 and Code2 are both members of a PRN code family, and their autocorrelation and crosscorrelation properties are known. It is therefore possible to calculate the crosscorrelation of the two codes at their respective phases by simply multiplying each bit of Code1 by the corresponding (in time) bit of Code2 to produce their crosscorrelation value. Since there may be a relative Doppler frequency offset between the two codes, the phase of the codes will process past one another over time and create a new crosscorrelation function. For the GPS system the greatest delta code Doppler typically encountered is about plus or minus 9 KHz which is equivalent to six code chips per second (1540 carrier cycles per code chip), and thus the maximum recalculation rate of the crosscorrelation value is roughly 6 times per second.

The maximum crosscorrelation occurs at a frequency offset of zero with peaks occurring at intervals of 1000 Hz. There is an attenuation of the crosscorrelation as the frequency offset moves away from zero. This attenuation follows the well known sin(x)/x curve. If 10 ms measurements are used for tracking or acquisition, the attenuation factor would be equal to sin($\Delta$freq*$\pi$/100 Hz)/($\Delta$freq*$\pi$/100 Hz). This produces an attenuation of −10 dB at about a 75 Hz delta frequency. Other local peaks in the sin(x)/x curve (i.e. locally minimum attenuation) occur at 150 Hz and 250 Hz with attenuations of −13.5 dB and −18 dB, respectively. This implies that for a desired strong signal suppression of 10 dB, only the first lobe of the sin(x)/x function need be considered; however, should additional suppression be desired, the entire curve may be considered.

The next step entails computing 112, for each strong signal, the product of the strong signal amplitude and the calculated frequency and time domain (code phase) crosscorrelation. The weak signal is finally extracted by subtracting 114 this product from the compound signal and processing is complete 116. The weak signal thus extracted is subsequently processed in the receiver circuitry as known in the art.

The in-phase (I) and quadrature amplitude (Q) of each strong signal is obtained by measurement in each strong signal's own individual receiver channel or by estimation through independent means. Because the strong signal is being actively tracked by the receiver's phase lock loops, the phase of the strong signal is presumed to be near zero radians and thus nearly all the signal power is in the in-phase portion.

A signal comprising a strong signal S1 modulated with a first code Code1 summed with a weak signal w2 modulated with a second code Code2 produces (S1*code1+w2*Code2). The sum of the two signals is correlated with a replica of the second code Code2R to produce $\Sigma${Code2R*(S1*Code1 30 w2*Code2)}, where the sum $\Sigma$ includes all chips of the PRN code used to modulate the weak signal w2. The autocorrelation of a code with itself is 1 so the preceding equation can be rewritten as $\Sigma${S1*Code1*Code2+w2}. It can see that in order to obtain w2 S1*Code1*Code2 is removed. Since we know Code1 and Code2, we can easily calculate their crosscorrelation. This leaves us to estimate the value of S1 that can be done by independently tracking the strong signal on a separate channel, or by any other convenient means. This computed value of S1*Code1*Code2 would be sufficient if the strong signal S1 and the weak signal w2 where at the same frequency. The two signals are received at different frequencies, however, due to the Doppler effect as well as other factors enumerated previously.

We know that strength of the crosscorrelation varies with the difference between these frequencies in a sin(x)/x relationship. We may therefore calculate an attenuation factor based on the difference in frequency between the strong and the weak signal and apply it to the computed crosscorrelation. Furthermore, if more than one strong signal is present, an attenuation factor is computed for each strong signal.

The code dependent portion of the crosscorrelation factor is computed from the known relative states of the PRN code generators to predict the crosscorrelation between a strong signal of unit power and zero frequency offset, and a weak signal. This factor is multiplied by the amplitude of the corresponding strong signal and adjusted for frequency attenuation before it is subtracted from the composite signal.

The various Gold codes used to modulate the PRN signals are all derived from a two code sequence G1 and G2 where the bits of the two code sequences are combined through an XOR operation after G2 has been offset some number of bits relative to G1 depending on the Gold code selected. It is known that an XOR operation using binary numbers is mathematically equivalent to multiplication of ±1. This allows expressing the equations below in term of products of ±1 while in reality the implementation could be with binary numbers with XORs.

The correlation between two C/A codes can generally be expressed as:

$$\Sigma Sat1G1(I)*Sat1G2(I)*Sat2G1(I\text{-offset})*Sat2G2(I\text{-offset})*e^{-j\Delta\theta I}$$

where

I=Summation index ranges from 0 to 1022.

Sat1G1(I)=Value of satellite 1's G1 coder chip at state I. Possible values are ±1.

Sat1G2(I)=Value of satellite 1's G2 coder chip at state I. Possible values are ±1.

Sat2G1(I)=Value of satellite 2's G1 coder chip at state I. Possible values are ±1.

Sat2G2(I)=Value of satellite 2's G2 coder chip at state I. Possible values are ±1.

offset=time difference between the satellite 1 and 2 in units of chips $\Delta\theta$*Phase change per chip between satellite 1 and 2 in radians.

It should be noted that when the difference I-offset is less than 0, 1023 is added to the difference to maintain the value in the range of 0 to 1022. In other words, the domain of the functions returning coder chip states is limited to the range of 0 to 1022.

The computation time required to compute the 1023 bit-by-bit correlations can be accelerated by making use of standard controller instructions that perform 8, 16 or 32 bit-wise XORs with a single controller instruction. The following will demonstrate the method of computing eight chips in parallel. Those skilled in the art will immediately recognize that the scheme can be easily modified to accommodate some other convenient number of bits per controller XOR operation. Such an approach may employ a single 1024 bit correlator match filter that performs the correlation for 1023 G1/G2 states concurrently.

The 1023 states of G1 and G2 may be stored linearly in permanent memory. Thus, it is possible to quickly gather 8, 16, 32 or some other convenient number of bits with a single controller load instruction by computing the address of the desired chip and the shift required to align it. Thirty-two bits is a particularly convenient number because 31 divides 1023 evenly. If a single 1024 bit correlator match filter is employed, the 32 bits of the PN code are derived at a time from the G1/G2 states and loaded into a 1024 wide reference shift register. The current implementation thus reads 32 bits at a time and uses 31 of them at a time for each of 33 intervals that span the 1023 chips of the C/A code. The 31 bit sums are broken into four parts of 8, 8, 8, and 7 bits, and each 7 or 8 bit sum is multiplied by $e^{-j\Delta\theta I}$ where I changes by 7.75 chips for each part. The form of the sum is:

$$\Sigma(e^{j\Delta\theta I}*31*\Sigma(Sat1G1(I*31+J)*Sat1G2(I*31+J)$$
$$*Sat2G1(I*31+J\text{offset})*Sat2G2(I*31*J\text{-offset}))+$$
$$e^{-j\Delta\theta(I*31+7.75)}*\Sigma(Sat1G1(I*31+J+8)*Sat1G2$$
$$(I*31+J+8)*Sat2G1(I*31+J+8\text{-offset})*Sat2G2$$
$$(I*31+J+8\text{-offset}))+e^{-j\Delta\theta(I*31+15.5)}*\Sigma(Sat1G1$$
$$(I*31+J+16)*Sat1G2(I*31+J+16)*Sat2G1(I*31+$$
$$J+16\text{-offset})*Sat2G2(I*31+J+16\text{-offset}))+e^{-j\Delta\theta}$$
$$(I*31+23.25)*\Sigma(Sat1G1(I*31+J+24)*Sat1G2(I*31+$$
$$J+24)*Sat2G1(I*31+J+24\text{-offset})*Sat2G2(I*31+$$
$$J+24\text{-offset})))$$

where

I=Outer index ranges from 0 to 32

J=Inner index ranges from 0 to 7 for the first three sums and from 0 to 6 for the last sum. The inner sums are computed in parallel by using a 32 bit word that contains all 31 bits and using bitwise XOR to perform the multiplications and shifting and adding to sum the 1 bit products.

Note that all of the multiplications of the G1 and G2 codes in the above equation are implemented by bit-wise XOR instructions. The above algorithm is in error by at most −17 dB from an exact computation, and requires about 6000 controller operations to complete.

Periodically, as needed, the code dependent crosscorrelation factors are computed for all strong and weak signal pairs with small frequency differences, i.e. frequency differences that could cause strong-weak crosscorrelation interference. In the current implementation strong signals are those with $C/N_0>40$ dB and weak signals are those with $C/N_0>30$ dB. Because 10 ms integrations of I and Q measurements are used by the code and phase tracking loops, the maximum "significant" frequency difference (modulo 1000 Hz) is 90 Hz. In the preferred embodiment the code dependent cross correlation factor for each possibly interfering pair of signals is computed for each of the measurements that might potentially be used by the tracking and signal processing algorithms. For example, if early, punctual and late measurements are used by the tracking loops, the correlation factors for each of these code alignments is computed and stored in the tables.

These tables only need be updated at a 10 Hz rate because the maximum Doppler difference is less than 9 KHz or less than six chips per second. In addition to maintaining the crosscorrelation table, the frequency attenuation of the crosscorrelation due to the frequency difference is computed at the 10 Hz rate. The attenuation can be expressed as:

$$\text{Frequency Attenuation}=\sin(\Delta F \bmod 1000*\pi/100)/(\Delta F \bmod 1000*\pi/100)$$

where $\Delta F$=Frequency difference between a strong and weak signal in Hz

Mod=modulo offset to give a range of −500 Hz to +500 Hz

The attenuation only needs to be recomputed if the frequency difference changes by more than 5 Hz.

An estimate of the phase and amplitude of the strong signal is required to remove the crosscorrelation. The method used in the preferred embodiment is to track the strong signal on its own dedicated channel and collect the I, Q measurements output over the exact same interval that the weak signal I, Q samples are taken. The known phase and frequency of the replica signal that is used to track the strong signal is an excellent approximation of the actual phase and frequency of the strong signal. Furthermore, because the strong signal is in phase lock, the magnitude of the I measurement provides a good approximation of the amplitude of the strong signal. Finally, the bi-phase modulation of the strong signal data bits D may cause the phase of the strong signal to rotate 180 degrees whenever the data bits transition from a 1 to 0 or from a 0 to 1. In the current implementation, the phase of the strong signal is corrected by adding 180 degrees to the phase of the replica signal whenever the sign of the I measurement for the strong signal is negative.

Every 10 ms a new set of I, Q correlation data is available from the channel assigned to track the weak signal. The tables of crosscorrelation factors are checked to predict the presence of any interfering strong signals. If strong signals are predicted, the following subtraction is performed to remove the strong signal crosscorrelations:

FirstCodeOffset=WeakCodeState−StrongCodeState−StrongDoppler*$\Delta$T−TableEntry0CodeState DeltaPhase=WeakCarrierPhase−StrongCarrierPhase−StrongDoppler*$\Delta$T+DeltaKHz*StrongCodeState FirstPhase=FirstCorrelationPhase+DeltaPhase SecondPhase=SecondCorrelationPhase+DeltaPhase
FirstMag=FirstCorrelationMag+
    FirstCodeOffsetFraction*StrongI*FrequencyAttenuation
SecondMag=SecondCorrelationMag*(1−FirstCodeOffsetFraction)*StrongI*FrequencyAttenuation
CorrectedWeakIQ=WeakIQ−FirstMag*$e^{-jFirstPhase}$−SecondMag*$e^{-jSecondPhase}$
where
WeakIQ=IQ correlation from the weak signal's channel.
CorrectedWeakIQ=IQ correlation corrected for crosscorrelation from the strong signal. CorrectedWeakIQ is computed for the early, on time, and late correlators by shifting the FirstCodeOffset appropriately, such as by half a chip each. These modified correlations are then used normally in the carrier and code tracking software for the weak signal. The algorithm attenuates the crosscorrelation by at least 10 dB without attenuating the weak signal, and is repeated for each strong signal that may be interfering with the weak signal.

Figure 2:
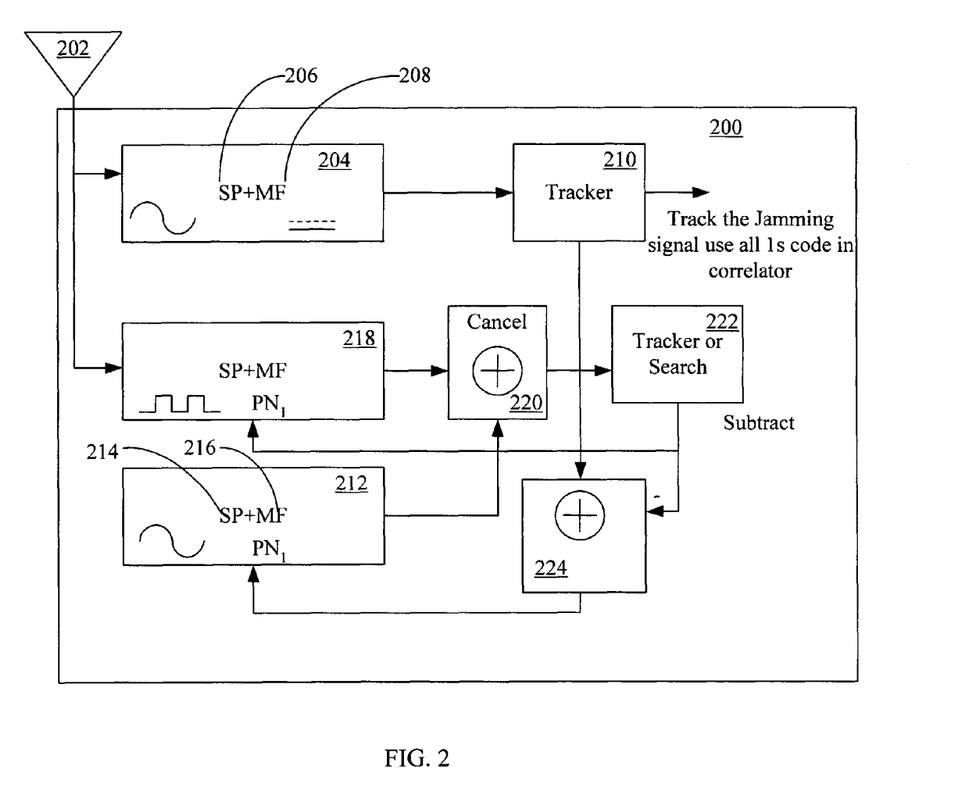
FIG. 2 illustrates a signal-processing diagram for identifying and removing CW jamming signals where the cancelled signal of FIG. 1 may be the CW jamming signal.

While FIG. 1 has described crosscorrelation to cancel a strong signal having a PRN from a weak signal having different PRN, the procedure may be modified to cancel a CW jamming signal and enhance a weak signal having a PRN. In FIG. 2, a signal-processing diagram for identifying and removing CW jamming signals where the cancelled signal of FIG. 1 may be a CW jamming signal is shown. The receiver 200 receives a spread spectrum signals at antenna 202. The crosscorrelator 204 is placed in a mode to identify CW jamming signals. In that mode, the crosscorrelator employs all ones for a PRN code. The crosscorrelator 204 may have a signal processor 206 and a match filter 208 that despreads the spread spectrum signal. The resultant signal is the CW jamming signal (the strong signal) and is tracked in the tracker 210. An example of the tracker 210 in the current implementation may be a phase lock loop circuit.

The identified CW jamming signal is then used to generate a replica CW jamming signal 212. The replica CW jamming signal may be created using a signal processor 214 and a match filter 216. In other implementations, other approaches to generating a desired signal may WeakCodeState=Code state of last output to the weak signals channel
StrongCodeState=Code state of last output to the strong signals channel
StrongDoppler=Doppler of last output to the strong signals channel ΔT=Difference in time between outputs to the weak and strong channels
TableEntry0CodeState=Code state difference of the first element of the crosscorrelation table.
WeakCarrierPhase=Carrier phase angle of last output to the weak signal channel
StrongCarrierPhase=Carrier phase angle of last output to the strong signal channel
Delta KHz=Nearest integer multiple of 1 KHz of the difference between the weak and strong channels Doppler. In units of KHz.
FirstCorrelationPhase=Phase entry in the crosscorrelation table for the chip indicated by FirstCodeOffset
SecondCorrelationPhase=Phase entry in the crosscorrelation table for the chip indicated by FirstCodeOffset+1 chip.
FirstCorrelationMag=Magnitude entry in the crosscorrelation table for the chip indicated by FirstCodeOffset.
SecondCorrelationMag=Magnitude entry in the crosscorrelation table for the chip indicated by FirstCodeOffset+1 chip.
FirstCodeOffsetFraction=Fraction of a chip in FirstCodeOffset.
StrongI=Absolute value of I correlation from the strong channel.
FrequencyAttenuation=Attenuation due to frequency offset. be employed. Examples of other approaches include, but are not limited to voltage controlled oscillators, digital signal processing, analog signal processing.

The spread spectrum signal received by receiver 200 is then processed by a crosscorrelator 214 with dispreading codes rather than the all ones. The received weak signal in the spread spectrum signal is demodulated by the signal processor in the crosscorrelator 218. The generated CW jamming signal is canceled from the weak signal by a canceller 220. The resultant signal is then tracked by a tracker 222. The CW jamming signal that is being tracked by tracker 210 is further processed to remove the desired weak signal from the tracked CW jamming signal resulting in a clean replica of the unwanted signal on the demodulation process of the desired signal in block 224.

The identification of the CW jamming signal has been described as occurring with three crosscorrelators 204, 218 and 212. But in practice, only one crosscorrelator may be used allowing the crosscorrlator to distinguish between PRN codes and to identify and remove CW jamming signals. Thus, the generation of a replica of the unwanted signal (CW jamming signal) occurs during the demodulation of the wanted signal.

Figure 3:
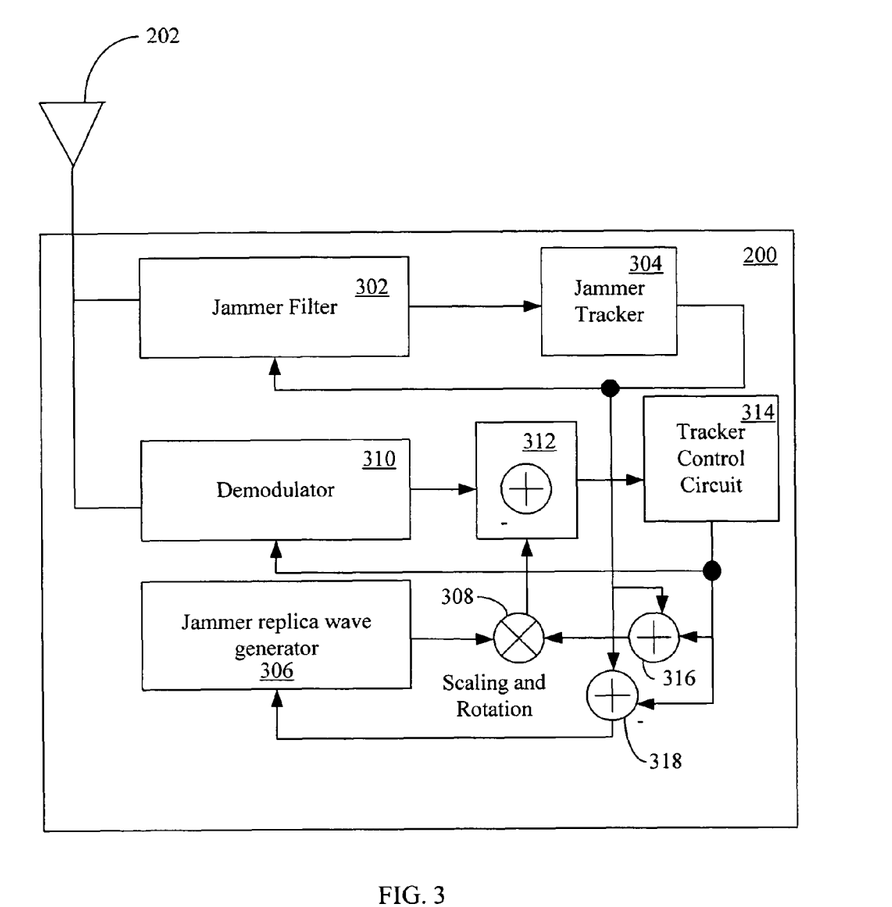
FIG. 3 is a block diagram of electrical components of FIG. 2.

Turning to FIG. 3, a block diagram of electrical components of FIG. 2 is shown. The spread spectrum signal containing the weak signal and the CW jamming signal are received at the receiver 200 via antenna 202. The spread spectrum signal is demodulated and the CW jammer signal is filtered by the jammer filter 302. The resulting CW jamming signal is tracked by jammer tracker 304. The tracked jamming signal is then replicated by a jammer replica wave generator 306 as a replicated CW jamming signal. The CW signal has the characteristic of a constant phase, therefore the replicated CW jamming signal is scaled and rotated 308 to an appropriate phase to be subtracted from the demodulated weak signal. The weak signal is demodulated by a demodulator 310. The phase and magnitude replicated CW jamming signal is then subtracted from the weak signal from the demodulator 302 by a signal canceller 312. The resulting weak signal is then tracked by a track control circuit 314. The track control circuit 314 outputs the weak signal to the demodulator 310 and two signal combiners 316 and 318. The weak signal is subtracted from the CW jammer signal by the signal combiner 316 and the resulting signal is used to scale and rotate the replicated CW jamming signal. Similarly, the weak signal is subtracted from the CW jamming signal by signal combiner 318 in order to provide a more accurate CW jamming signal to be replicated by the jammer replica wave generator 306.

Even though the current implementation has been described with CW jamming signals in general, one skilled in the art would recognize that specific known signals such as IS-95 pilot signals, Galileo signals, or other known carriers may be identified, tracked and remove from a demodulated desired signal. Unlike other known methods of identifying and removing CW jamming signals prior to signal processing or at the front end of a receiver, the current approach identifies and removes the CW jamming signal at the back end. This is advantageous when desired signals are received at low signal strength, such as in CDMA or satellite positioning system. The signal strength is not sufficient to support preprocessing of the signal while maintaining the desired weak signals.

Figure 4:
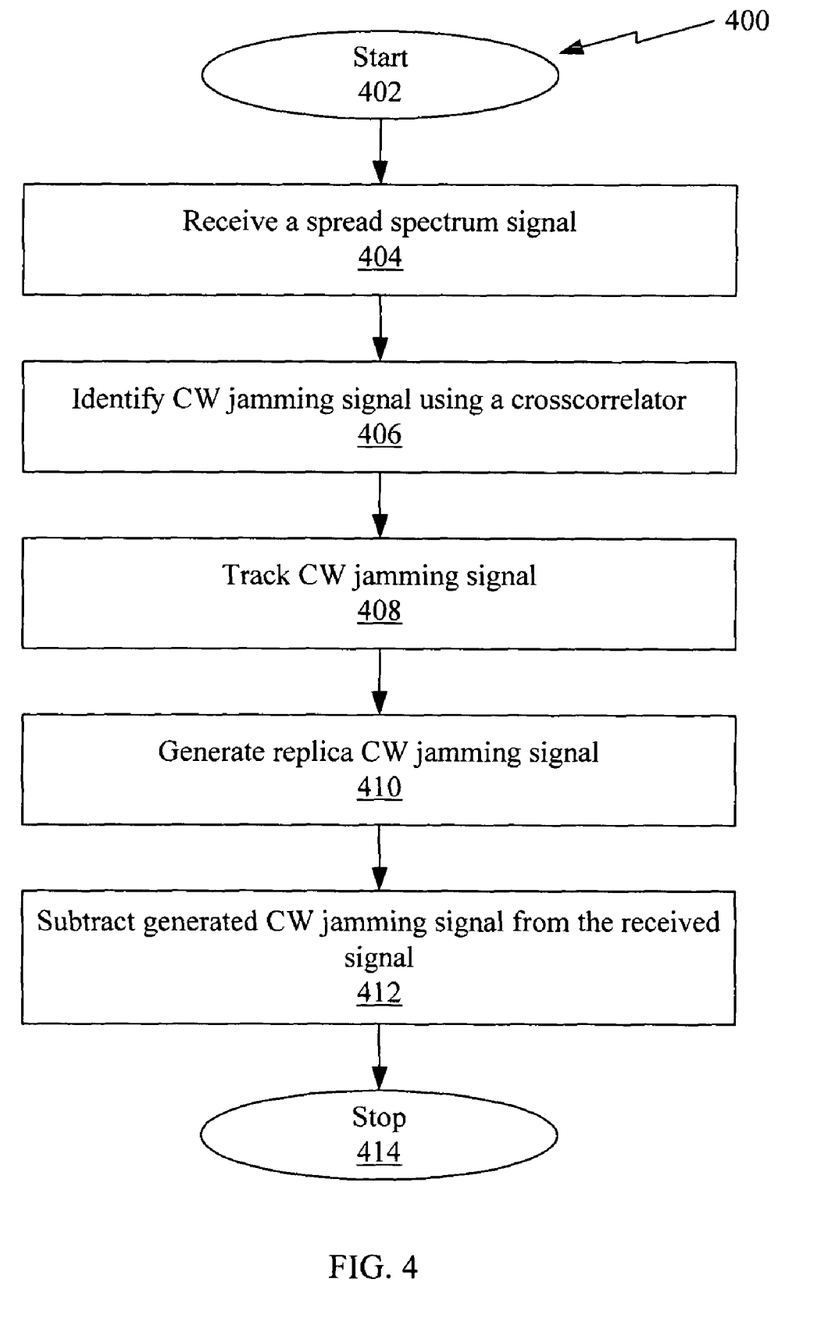
FIG. 4 is a flow diagram of the identifying and removing CW jamming signals.

Turning to FIG. 4, a flow diagram 400 of the identifying and removing CW jamming signals is shown. The procedure starts 402 with a receiver 200 receiving a spread spectrum signal 404. The signal may be filtered and the CW jamming signal is identified 406 using a crosscorrelator. Once the CW jamming signal is identified 406, it is tracked 408. The tracked CW jamming signal is then replicated 410 by a jammer replica wave generator 306. The replicated CW jammer signal is then subtracted from the received signal 412. The CW jamming signal has been removed from the received signal and processing is complete 414.

The foregoing description of an implementation has been presented for purposes of illustration and description. It is not exhaustive and does not limit the claimed inventions to the precise form disclosed. Modifications and variations are possible in light of the above description or may be acquired from practicing the invention. For example, the described implementation includes software but the invention may be implemented as a combination of hardware and software or in hardware alone. Note also that the implementation may vary between systems. The claims and their equivalents define the scope of the invention.

What is claimed is:

1. A radio receiver apparatus in receipt of a spread spectrum radio signal having a first signal tracking channel and a second signal tracking channel, comprising:
    a demodulator that demodulates a first signal in the spread spectrum radio signal into the first signal tracking channel and a second signal in the spread spectrum radio signal into the second signal tracking channel;
    a crosscorrelator connected to the first signal tracking channel and the second signal tracking channel;
    a first signal processor that identifies a carrier wave jamming signal with the crosscorrelator that is in a mode to identify carrier wave jamming signals by correlation with a fixed predetermined code for a pseudo random number (PRN) code, where the crosscorrelator has a code of all ones for the PRN code;
    a first tracker that tracks the carrier wave jamming signal;
    a first signal canceller that subtracts a replica of the carrier wave jamming signal from the spread spectrum signal and generates a resultant spread spectrum signal;
    a second tracker that tracks the resultant spread spectrum signal;
    a second signal canceller that subtracts the resultant spread spectrum signal from the tracked carrier wave jamming signal and produces a clean carrier wave jamming signal; and
    a second signal processor connected to the first and second signal cancellers that receives the clean carrier wave jamming signal from the second signal canceller and generates the replica of the carrier wave jamming signal from the clean carrier wave jamming signal.

2. The radio receiver apparatus of claim 1, wherein the second signal generator generates a replica carrier wave jamming signal having a phase from the carrier wave jamming signal having another phase and subtracts the replica carrier wave jamming signal from the spread spectrum signal to cancel the carrier wave jamming signal.

3. The radio receiver apparatus of claim 2, further comprises:
    a signal rotator that rotates the phase of the replica carrier wave jamming signal.

4. The radio receiver apparatus of claim 3, wherein the signal rotator adjusts the phase of the replica carrier wave jamming signal to match the other phase of the carrier wave jamming signal in the spread spectrum signal.

5. The radio receiver apparatus of claim 1, wherein the spread spectrum radio signal is a position signal.

6. The radio receiver apparatus of claim 1, wherein the crosscorrelator is at least a 1024 bit wide correlator.

7. The radio receiver apparatus of claim 6, where the crosscorrelator further comprises:
    at least one 1024 bit wide match filter.

8. A method of removing a carrier wave jamming signal from a spread spectrum signal having a first signal tracking channel and a second signal tracking channel, comprising:
    demodulating a first signal in the spread spectrum radio signal into the first signal tracking channel and a second signal in the spread spectrum radio signal into the second signal tracking channel;
    correlating the first signal tracking channel and the second signal tracking channel with a crosscorrelator;
    changing the crosscorrelator from a cross correlation identification mode to a carrier wave jamming signal identification mode where the crosscorrelator correlates in the carrier wave jamming signal identification mode with a fixed predetermined code for a pseudo random number (PRN) code;
    configuring the crosscorrelator with a code of all ones for the PRN code;
    computing a product of the first signal tracking channel and the second signal tracking channel to obtain a carrier wave jamming signal;
    tracking the carrier wave jamming signal;
    canceling the carrier wave jamming signal from the spread spectrum signal;
    generating a resultant spread spectrum signal;
    tracking the resultant spread spectrum signal;
    canceling the resultant spread spectrum signal from the tracked carrier wave jamming signal;
    producing a clean carrier wave jamming signal; and
    generating the replica of the carrier wave jamming signal from the clean carrier wave jamming signal.

9. The method of claim 8, where canceling the carrier wave jamming signal further comprising:
    generating a replica carrier wave jamming signal having a phase from the carrier wave jamming signal having another phase; and
    subtracting the replica carrier wave jamming signal from the spread spectrum signal to cancel the carrier wave jamming signal.

10. The method of claim 9, further comprising:
    rotating the phase of the replica carrier wave jamming signal.

11. The method of claim 10, further comprising:
    adjusting the phase of the replica carrier wave jamming signal to match the other phase of the carrier wave jamming signal in the spread spectrum signal.

12. The method of claim 8, wherein the spread spectrum radio signal is a position signal.

13. The method of claim 8, wherein the crosscorrelator is at least a 1024 bit wide correlator.

14. The method of claim 13, wherein the crosscorrelator further comprises:
    filtering with an at least a 1024 bit wide match filter.

15. A receiver in receipt of a spread spectrum radio signal having a first signal tracking channel and a second signal tracking channel, comprising:
    demodulation means for demodulating a first signal in the spread spectrum radio signal into the first signal tracking channel and a second signal in the spread spectrum radio signal into the second signal tracking channel;

correlation means for correlating the first signal tracking channel and the second signal tracking channel;

computation means for computing a product of the first signal tracking channel and the second signal tracking channel to obtain a carrier wave jamming signal, when the correlation means is in a carrier wave jamming identification mode by correlating with a fixed predetermined code for pseudo random number (PRN) code;

means for configuring the correlation means with a code of all ones for the PRN code;

means for tracking the carrier wave jamming signal;

canceling means that cancels the carrier wave jamming signal from the spread spectrum signal;

means for generating a resultant spread spectrum signal;

means for tracking the resultant spread spectrum signal;

means for canceling the resultant spread spectrum signal from the tracked carrier wave jamming signal;

means for producing a clean carrier wave jamming signal; and means for generating the replica of the carrier wave jamming signal from the clean carrier wave jamming signal.

16. The receiver of claim 15, wherein canceling means further, comprises:

generating means for generation of a replica carrier wave jamming signal having a phase from the carrier wave jamming signal having another phase; and subtracting means for subtraction of the replica carrier wave jamming signal from the spread spectrum signal to cancel the carrier wave jamming signal.

17. The receiver of claim 16, further comprising:

means for rotating the phase of the replica carrier wave jamming signal.

18. The receiver of claim 17, further comprising:

means for adjusting the phase of the replica carrier wave jamming signal to match the other phase of the carrier wave jamming signal in the spread spectrum signal.

19. The receiver apparatus of claim 15, wherein the spread spectrum radio signal is a positioning signal.

20. The receiver of claim 15, wherein the correlation means is at least a 1024 bit wide correlator.

21. The receiver of claim 20, where the correlation means further includes:

an at least a 1024 bit wide match filter.

* * * * *

UNITED STATES PATENT AND TRADEMARK OFFICE
CERTIFICATE OF CORRECTION

| | | |
|---|---|---|
| PATENT NO. | : 7,822,105 B2 | |
| APPLICATION NO. | : 10/689565 | |
| DATED | : October 26, 2010 | |
| INVENTOR(S) | : Paul Underbrink, Henry Falk and Charles Norman | |

It is certified that error appears in the above-identified patent and that said Letters Patent is hereby corrected as shown below:

Column 4, line 32, delete "$\Sigma\{Code2R*(S1*Code130$" and substitute --$\Sigma\{Code2R*(S1*Code1$--

Column 7, line 27, delete "a"

Column 8, line 25, delete "crosscorrlator" and substitute --crosscorrelator--

Column 8, line 59, delete "remove" and substitute --removed--

Column 7, lines 9 through 40 deleted from current location and inserted following column 8, line 6 "set."

Signed and Sealed this
Eighth Day of March, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,822,105 B2 | Page 1 of 1 |
| APPLICATION NO. | : 10/689565 | |
| DATED | : October 26, 2010 | |
| INVENTOR(S) | : Underbrink et al. | |

It is certified that error appears in the above-identified patent and that said Letters Patent is hereby corrected as shown below:

On the Title Page, under "Primary Examiner", in Column 2, Line 1, delete "Chiem M Fan" and insert -- Chieh M Fan --, therefor.

In the Claims

In Column 11, Line 23, in Claim 16, delete "further, comprises:" and insert -- further comprises: --, therefor.

In Column 12, Line 15, in Claim 19, delete "receiver apparatus" and insert -- receiver --, therefor.

Signed and Sealed this
Twenty-eighth Day of April, 2015

Michelle K. Lee
*Director of the United States Patent and Trademark Office*